J. Watson,
Brick Machine.
No 2,533. Reissued Mar. 26, 1867.
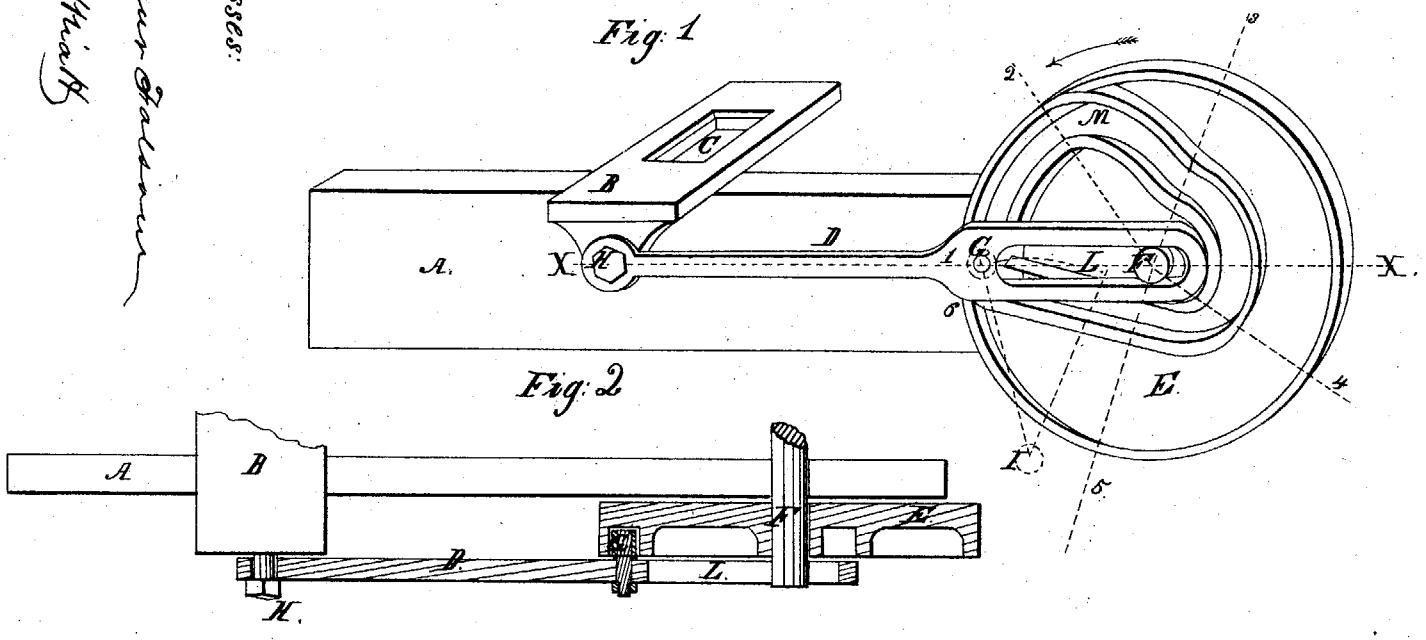
Witnesses:
Oscar Falsom
G. J. Hiatt
Inventor:
John Watson
AM. PHOTO-LITHO. CO. N.Y. (OSBORNE'S PROCESS)

United States Patent Office.

JOHN WATSON, OF BUFFALO, NEW YORK, ASSIGNEE BY MESNE ASSIGNMENTS OF HIMSELF.

*Letters Patent No.* 55,432, *dated June* 5, 1866; *reissue No.* 2,533, *dated March* 26, 1867.

IMPROVEMENT IN BRICK MACHINES.

The Schedule referred to in these Letters Patent and making part of the same.

TO ALL WHOM IT MAY CONCERN:

Be it known that I, JOHN WATSON, of Buffalo, in the county of Erie, and State of New York, have invented a new and useful device for giving the necessary reciprocating motion to the Sliding Mould of a Brick Machine; and I do hereby declare that the following is a full, clear, and exact description of the construction and operation of the same, reference being had to the accompanying drawings, making a part of this specification, in which—

Figure 1 is a perspective view.

Figure 2, a section through line X X in fig. 1.

The nature of my invention consists in the combination of an internal or grooved cam a connecting-rod, or the equivalent thereof, and the sliding mould of a brick machine, for the purpose of giving to said mould the necessary reciprocating motions.

In the said drawings like letters represent similar parts in figs. 1 and 2.

B represents the upper part of the sliding mould. A sliding mould to a brick machine is generally understood to be that part of the machine which is made in the form of a trunk or box, with an opening similar to C, through which the clay is introduced to be pressed into the form of a brick or block by the pressing pistons, said mould being so constructed as to surround and fit closely to said pistons and to move or slide back and forth over them for the purpose of admitting the clay, as aforesaid, and confining it while the pressure is being given; but as the sliding mould of itself alone does not constitute my invention, and as the construction and office of the same on brick machines are generally understood, a minute description here is unnecessary. D is a connecting-rod, which connects to the sliding mould at the joint H and to the cam E by a pin or friction-roller, shown by letter G. This connecting-rod, D, is represented as having a slot, L, which is arranged to slide over or stride the shaft F for the purpose of keeping the connecting-rod in the same line, or nearly so, with the motion of the sliding mould. Of course there are other equivalent means of transmitting the motions produced by the cam to the mould. The connecting-rod D may be shortened, leaving it long enough for the pin or friction-roller G, and an arm may be jointed to it at or near the letter G, the opposite end of said arm being so jointed that it will swing at the joint I by the motion of the connecting-rod, as shown by the dotted lines in red ink. M represents the groove in the cam; it is so formed as to give the necessary reciprocating motions to the mould, which is done by means of its connections at the points H and G. The sides of the groove M, which bear against the pin or friction-roller G and produce the said motions as required, are colored red, to distinguish them from those parts which do not assist in producing the said reciprocating motions, and hence might be dispensed with; but I prefer having the entire groove enclosed, for the reason that if at any time the machinery should be started or moved backward, the pin or friction-roller would be apt to be forced out of place and broken or otherwise deranged; besides, I think the appearance of the cam is improved by having the groove entire; nevertheless, the leaving out of those parts of the cam which do not assist in giving said motions to the connecting-rod D and sliding mould B would in no way change the nature of my invention. In a complete machine there are two connecting-rods, D, two cams, E, and one sliding mould, B, although the same piece, marked B in fig. 1, may be made to have two or more moulds, if required, the strength of the parts being increased in proportion.

The motions transmitted by the cam to the mould B are as follows: While it revolves in the direction of the arrow until figure 2 is near figure 1 the sliding mould is held stationary, or nearly so, long enough to be filled with clay. Said motion being still continued until figure 3 is at figure 1, moves the mould B backward until part of it covers the ends of the pistons, leaving sufficient clay enclosed to form a brick. Said mould again remains stationary until figure 4 reaches figure 1. In the mean time the pistons have moved and pressed the brick. Said motion being continued until figure 5 is brought to figure 1 draws the mould B still further back, which uncovers the brick and allows it to be lifted out, and when figure 6 is brought around to figure 1 the revolution of the cam is complete, and the mould is again in position to be filled with clay. In a large machine the principal materials are cast and wrought iron.

What I claim as my invention, and desire to secure by Letters Patent, is—

The combination of an internal or grooved cam, as described, with a connecting-rod, or the equivalent thereof, operating the sliding mould of a brick machine for the purpose of giving to the said mould the necessary reciprocating motions.

I also claim the combination of the pin G with the cam E, to operate the above-mentioned reciprocating motion of mould B, as and for the purposes described.

JOHN WATSON.

Witnesses:
OSCAR FOLSOM,
G. T. MIATT.